United States Patent
Vichinsky

(10) Patent No.: US 8,641,319 B2
(45) Date of Patent: Feb. 4, 2014

(54) APPARATUS AND METHOD OF COMPRESSIBLY SECURING A STACKED ASSEMBLY OF CREEP-SUSCEPTIBLE COMPONENTS

(75) Inventor: Kevin Vichinsky, Portage, MI (US)

(73) Assignee: Mann+Hummel GmbH, Ludwigsburg (DE)

( * ) Notice: Subject to any disclaimer, the term of this patent is extended or adjusted under 35 U.S.C. 154(b) by 496 days.

(21) Appl. No.: 12/429,730

(22) Filed: Apr. 24, 2009

(65) Prior Publication Data

US 2010/0272508 A1 Oct. 28, 2010

(51) Int. Cl.
*F16D 1/00* (2006.01)
(52) U.S. Cl.
USPC ........................................ 403/408.1; 403/220
(58) Field of Classification Search
USPC .......... 411/546, 388, 389, 544; 206/519, 516,
206/515, 509, 508, 505, 504; 403/408.1,
403/167, 168, 220, 256, 258, 260, 262;
277/611, 639, 593; 429/96, 99, 159;
29/407.09, 407.1
See application file for complete search history.

(56) References Cited

U.S. PATENT DOCUMENTS

| | | | | |
|---|---|---|---|---|
| 1,916,755 A | * | 7/1933 | Dowdell | 206/500 |
| 4,233,371 A | * | 11/1980 | Dorrestijn | 429/152 |
| 4,535,996 A | * | 8/1985 | Cardis et al. | 277/313 |
| 5,513,603 A | | 5/1996 | Ang et al. | |
| 5,662,444 A | | 9/1997 | Schmidt | |
| 5,807,052 A | | 9/1998 | Van Boven et al. | |
| 6,511,766 B1 | * | 1/2003 | Loutfy et al. | 429/454 |
| 6,804,872 B2 | * | 10/2004 | Powell | 29/525.11 |

* cited by examiner

*Primary Examiner* — Victor MacArthur
*Assistant Examiner* — James Linford
(74) *Attorney, Agent, or Firm* — James Hasselbeck

(57) ABSTRACT

An apparatus and method compressibly secure together a plurality of components, wherein some of the components may include plastic or other materials susceptible to creep. The apparatus includes a plurality of stackable compression limiters configured to engage axially end to end in tandem and in some aspects to lockably engage. Each stackable compression limiter includes an elongated sleeve member configured to limit the maximum compressive force applied to its associated component, where different components in the stacked assembly may be configured for different maximum compressive forces.

4 Claims, 6 Drawing Sheets

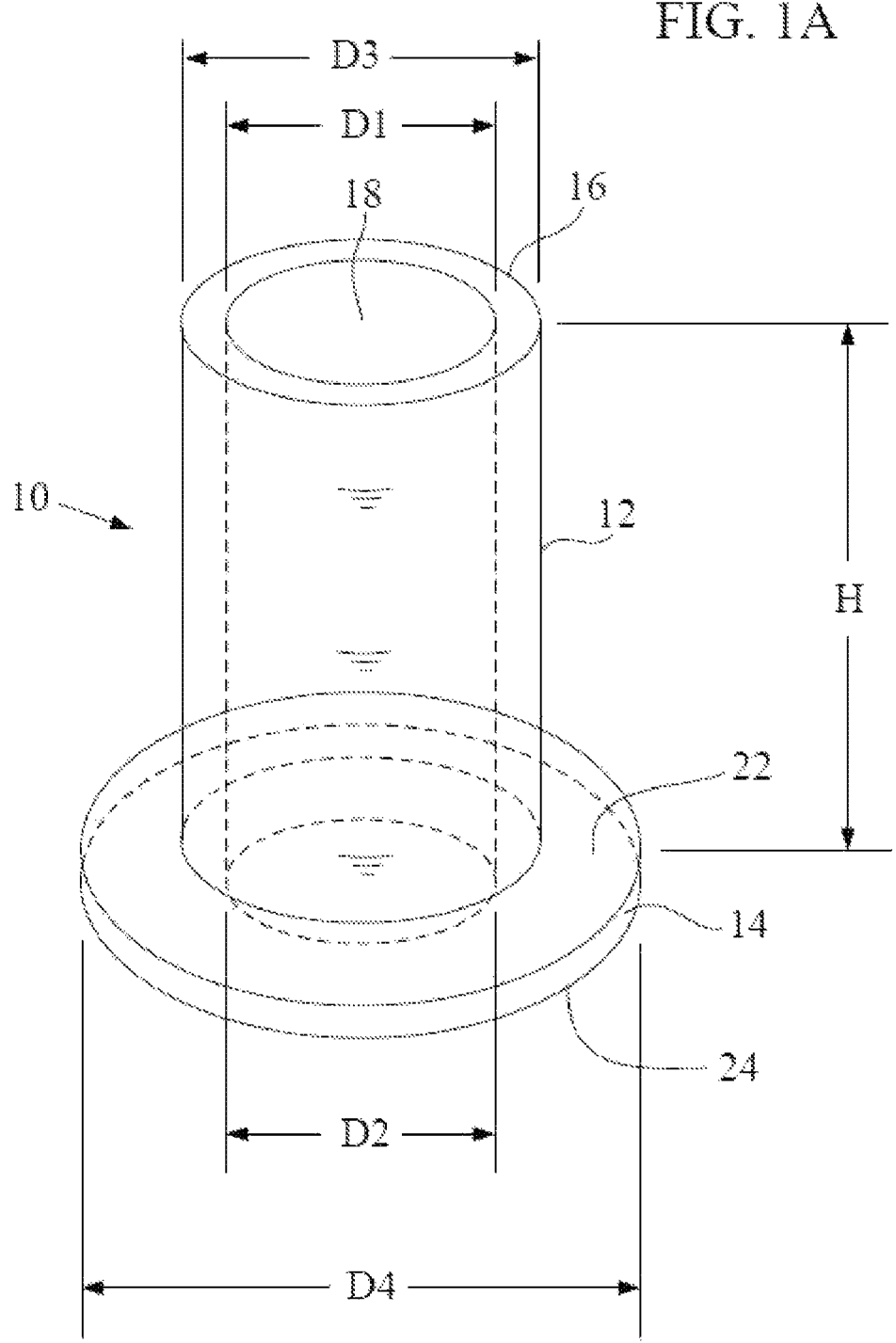

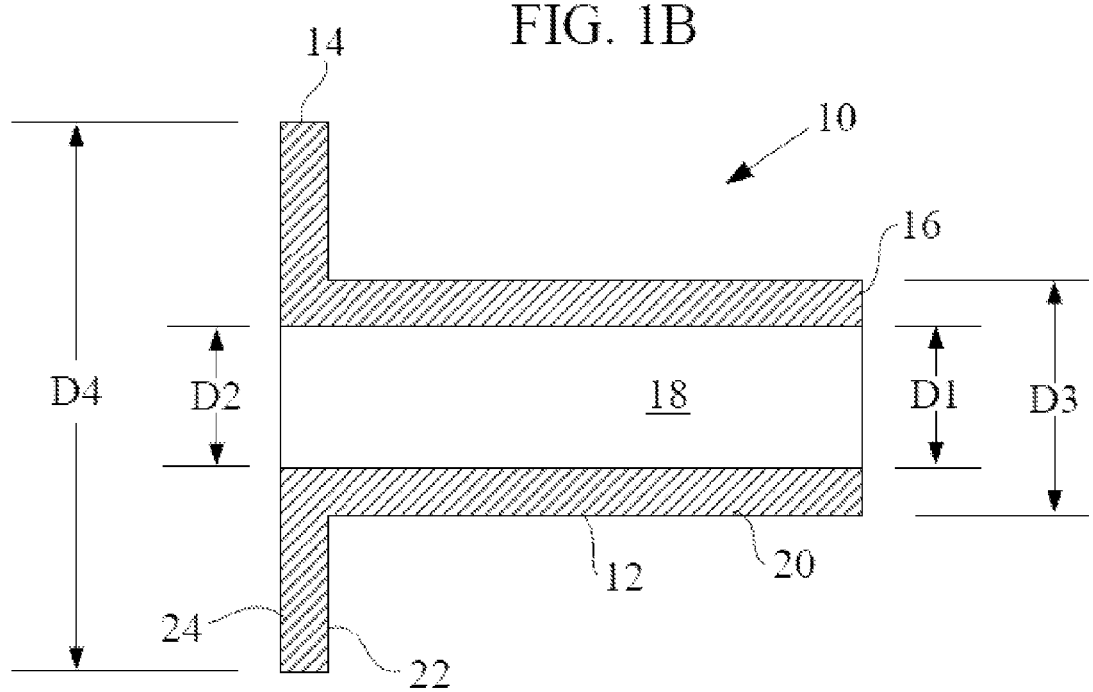
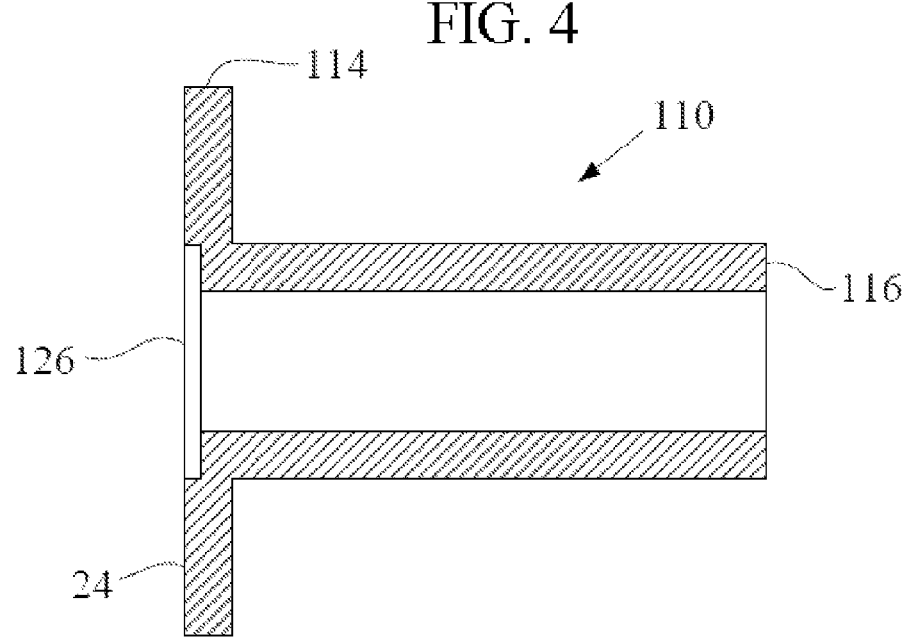

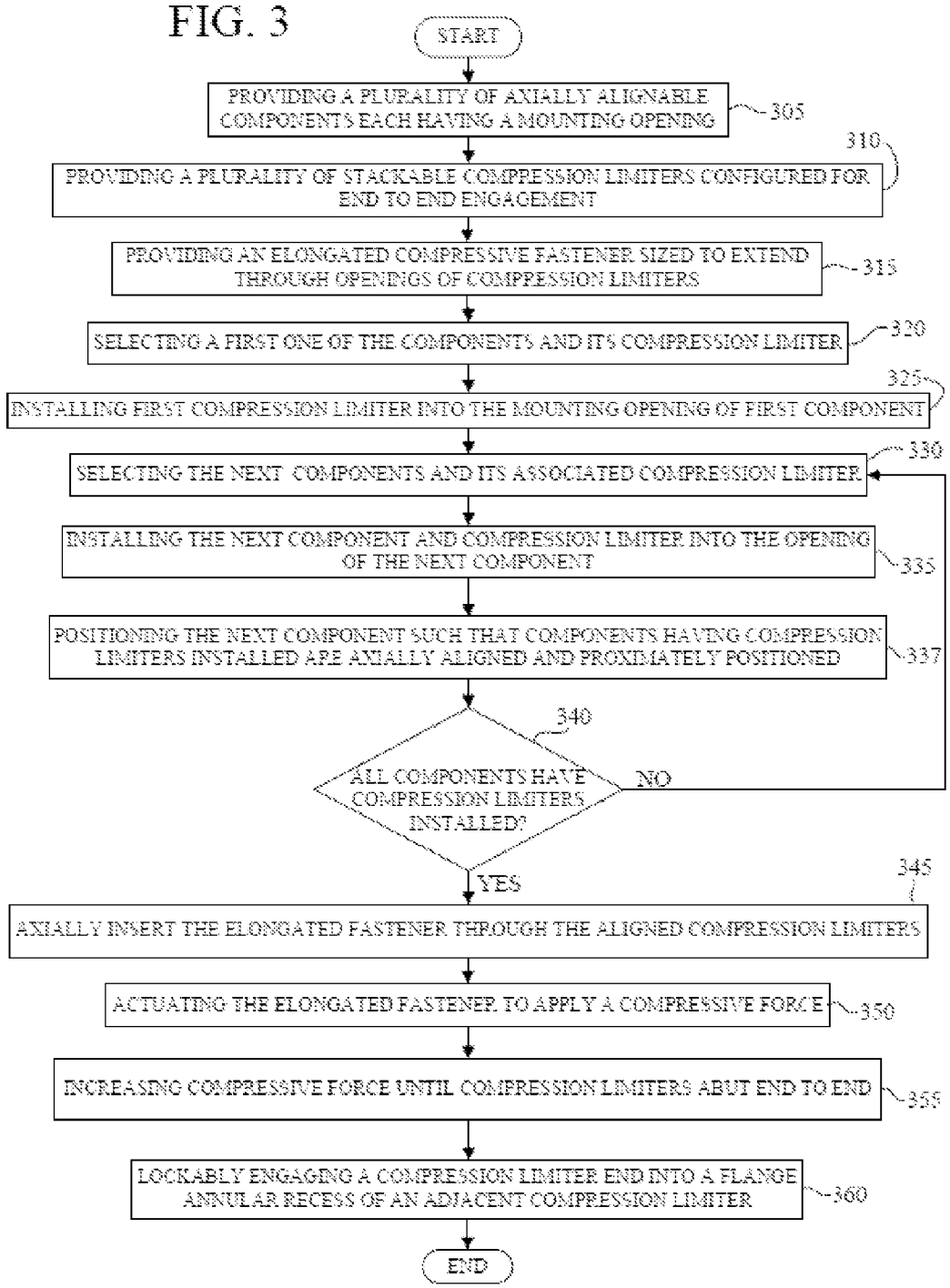

APPARATUS AND METHOD OF COMPRESSIBLY SECURING A STACKED ASSEMBLY OF CREEP-SUSCEPTIBLE COMPONENTS

TECHNICAL FIELD

This present invention relates generally to apparatus and methods for limiting compressive forces applied to elastic components by fasteners and, more particularly, to apparatus and methods for securing together a stacked assembly of components.

BACKGROUND OF THE INVENTION

Advances in polymer technologies have enabled the widespread use of relatively lightweight and lower cost molded plastic components in applications that formerly required the use of metal components. In many applications plastic components are secured to other components using compressive fasteners such as bolts or screws. It is known that applying excessive compressive forces to plastic components using such fasteners can lead to cracking or mechanical failure of the plastic component. It is therefore desirable to provide a compression limiter configured to limit compressive forces applied to the plastic component by conducting excessive compressive force away from and around the plastic component.

To that end, various types of compression limiters have been developed and applied in the art. For example U.S. Pat. No. 5,513,603 provides a fastener isolation system for mounting a thermoplastic valve cover on an engine. The fastener includes an elastic bushing or washer and a relatively incompressible metallic sleeve limiting compression that may be applied to the thermoplastic valve cover by the fastener.

U.S. Pat. No. 5,807,052 discloses another variety of compression limiter having a sleeve member extending through an opening provided between the outer and inner surfaces of a work piece. The sleeve member includes a substantially radial flange member configured to engage a surface of the work piece.

It is further known than molded plastic materials, when subject to compressive forces over time, are susceptible to a permanent material shape distortion known as "creep". When a plastic component is initially fastened using a fastener such as a bolt, the bolt applies an initial compressive load to the plastic component. Over time the plastic material deforms or "creeps" in a manner to reduce the applied compressive load of the bolt at the point of contact. As the compressive load decreases, the component is no longer securely held in place and may be free to shift or to vibrate, defeating what may have been a robust component mounting.

Unfortunately, the past methods and apparatus for limiting compression in mounting plastic components, while quite functional for mounting individual plastic components to a substrate, do not offer a solution for securing together stacks of plastic or other creep-susceptible components. As plastic materials are known to change dimensions or creep over time, the compressive fasteners such as bolts applied to secure a stacked assembly of plastic components together may loosen over time.

SUMMARY OF THE INVENTION

The present invention provides a fastening assembly adapted to compressibly secure together a plurality of components, wherein some of the components may be comprised of plastic or other materials susceptible to creep. The fastening assembly includes a plurality of stackable compression limiters configured to engage axially end to end in tandem. Each stackable compression limiter includes an elongated sleeve member with an axial bore therethrough, an engagement surface provided at one end of the sleeve member, a flange member provided at and extending radially from an opposing end of the sleeve member and having an outer portion of a flange surface sized and configured to compressively engage against a mounting surface of an associated component. The flange surface also has an inner portion sized and configured to be compressively engageable against the engagement surface of an adjacent axially aligned compression limiter. An elongated compressive fastener is provided, sized and configured to be received into the axially aligned bores of the compression limiters and extend therethrough. Each compression limiter may be adapted for use with a different one of the plurality of components. Each of the compression limiters have a sleeve diameter configured to be received into a mounting bore of its associated component. Each compression limiter has a length not exceeding a thickness of its associated component with the length selected to set an upper limit on an amount of compressive force applied to its associated component. The stackable compression limiters are configured and adapted to reduce the dimensional stack up tolerance for the assembly and reduce occurrences of mounting failure due to material creep of creep-susceptible components.

In another aspect of the invention a method is disclosed for compressibly fastening a plurality of components, of which some are creep susceptible, into a singular compressibly bound assembly.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 1A depicts a perspective schematic view of one embodiment of a stackable compression limiter, consistent with the present invention;

FIG. 1B depicts a section view of the stackable compression limiter of FIG. 1A;

FIG. 4 depicts a modified form of construction of the stackable compression limiter 12 of FIG. 1B in a separate view (FIG. 4) as compression limiter 110, consistent with the present invention;

FIG. 2A shows the components 32A and prior to application of the compressive force;

FIG. 3 is a flow chart illustrating a method of compressibly fastening a plurality of components, some of which are creep susceptible, into a singular compressibly bound assembly.

Figure 2:
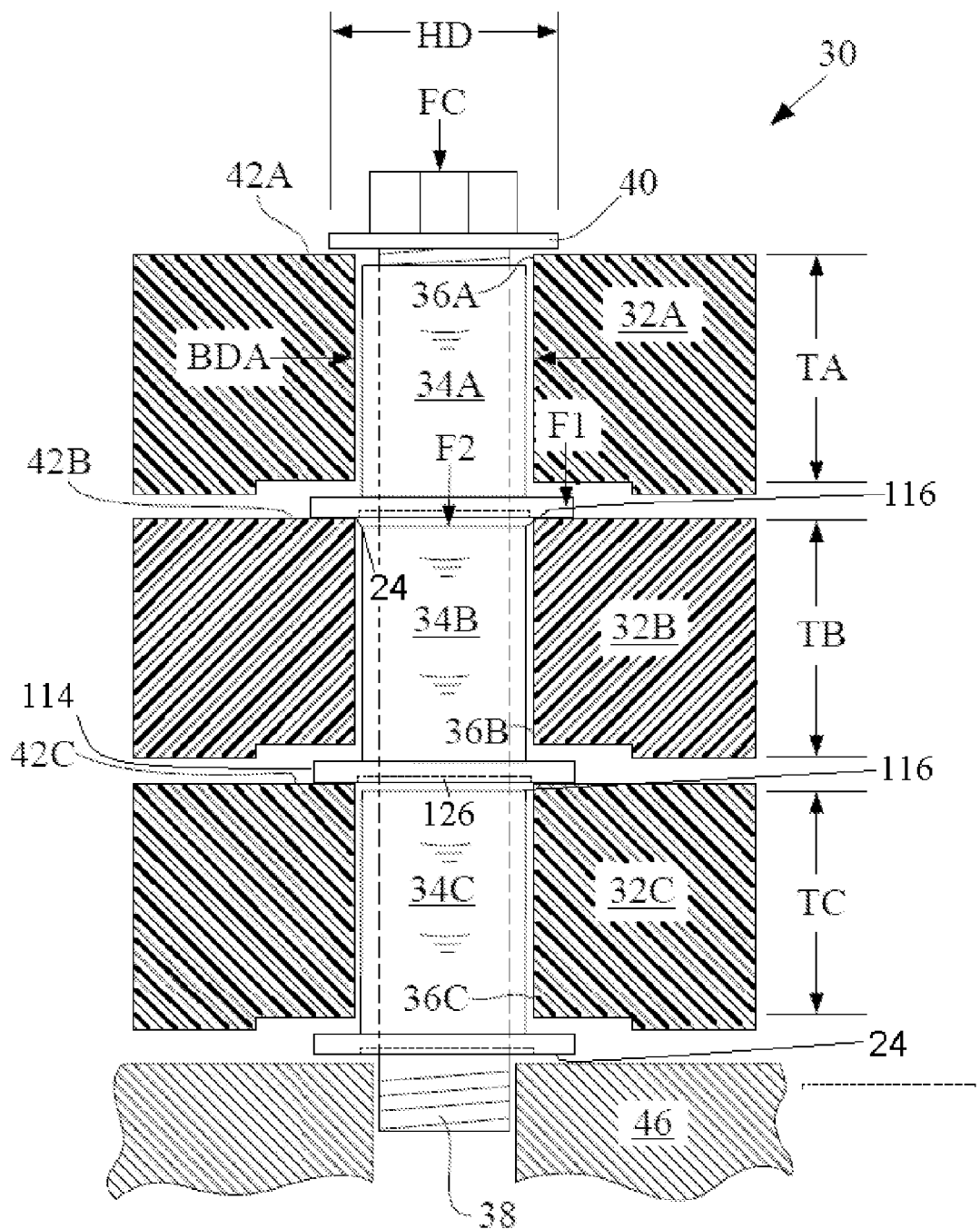
FIG. 2 presents a schematic assembly view of the stackable compression limiters of the present invention compressively securing a plurality of components, some of which are susceptible to creep, to form a singular stacked compressively bound assembly, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an apparatus and method of compressibly securing a stacked assembly of creep-susceptible components. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

A compression limiter is sometimes used when compressively mounting a plastic component onto another substrate component (for example a plastic valve cover to a metallic engine head). Further to this example, a bolt (herein one suitable example of a compressive fastener) may be inserted through the compression limiters and tightened, compressing the plastic component against the substrate until the bolt head comes into contact with the compression limiter. Thereafter, the compression limiter and the plastic component will compress at the same rate (dimensionally). As the comparison limiter is designed to be comparatively incompressible relative to the plastic component (for example a steel compression limiter may be used) then the compression limiter acts to transfer additional/excessive clamping loads applied by the bolt, thereby bypassing these loads around the plastic component.

Several design considerations relative to compression limiters are known to those skilled in the art. The compression limiter is designed to have a length sufficient to prevent the plastic component from exceeding its elastic limit. The design load of the compression limiter should always be at least as great as the worst case expected clamping load of the bolt so that the compression limiter does not yield or fail under excessive clamping loads.

Simple compression limiters are known in the art. What is not known are stackable compression limiters that are configured to be axially aligned and abutted end to end over a common shared elongated compressive fastener, and where each are configured to act as virtual bold heads to compressively engage individual creep-susceptible or plastic components in the assembly stack such that any chosen component is compressively secured to an adjacent component by the compressive action of the virtual bolt head of the compression limiter. This concept will be described further with reference to the included exemplary illustrations.

FIGS. 1A and 1B depict one embodiment of a stackable flanged compression limiter 10 consistent with the present invention. The compression limiter 10 includes a sleeve member 12 having a bore 18 extending axially through the compression limiter 10. In an exemplary embodiment, the sleeve member has a cylindrical outer surface 20 and a cylindrical bore 18. The bore 18 is sized and configured to receive an elongated compressive fastener therethrough, for example a threaded bolt (shown later with FIG. 2). A radially extending flange 14 is provided at a first end of the sleeve member 12. In at least one exemplary embodiment the flange 14 is permanently secured to the first end of the sleeve member 12. In another alternate embodiment the flange 14 may be a separate component from the sleeve member 12. When the flange 14 is a separate component from the sleeve member 12, the flange has a first flange surface 22 sized and configured to engage against the first end of the sleeve member 12, and have a flange bore diameter D2 that is preferably identical to the sleeve bore diameter D1, or at least is not greater than the sleeve outer diameter or outside dimension D3. In cases when the sleeve 12 is cylindrical, then D3 represents a diameter. In cases when the sleeve 12 is another shape, for example an elongated polygon shape, then D3 represents the dimension across opposing and similarly aligned flats of the polygon. The sleeve 12 may have any desired cross sectional shape, with a circular shape preferred. The flange 14 has a flange surface 24 with an inner portion sized and configured to compressively engage against a mounting surface of an associated component, such as the engagement a surface 16 of an adjacent axially aligned compression limiter.

As discussed in the background, certain varieties of compression limiters are known in the art. The improved compression limiters disclosed herein deviates from the prior art in they are configured to be used in tandem, axially aligned end to end and include features configured to act as virtual bold heads to compressibly clamp individual components in the assembly stack while establishing individual and possibly differing upper limits on the compressive force applied to each component in the stacked assembly.

FIG. 4 depicts a modified form of construction of the stackable flanged compression limiter 12 of FIG. 1B in a separate view (FIG. 1C). The modified stackable flanged compression limiter 110, deviates from the above stackable flanged compression limiter 10 of FIG. 1B chiefly in that the radial flange 114 includes an annular recess 126 sized and configured to snugly engage and positionally lock the radial flange of one stackable compression limiter 110 against the engagement surface (16 or 116) of an axially aligned adjacent stackable compression limiter (10 or 110), thereby preventing the stackable flanged compression limiters from sliding or dislocating radially relative to each other, thereby providing closer dimensional tolerances for the resultant compressibly bound assembly.

FIG. 2 depicts a stacked assembly of plastic or resin based components compressibly secured using stackable compression limiters consistent with the present invention. For convenience and simplicity only three components in the assembly are illustrated, although the assembly may have any number of stacked components, some intended embodiments have, for example, sixty to seventy components secured by axially aligned and abutted stackable compression limiters of the present invention.

In FIG. 2, a stacked assembly of components, for example 32A, 32B and 32B are compressibly secured together to form a unitary assembly 30. At least some of the components may comprise creep-susceptible materials, for example a variety of plastic. In the illustrated example, each component 32A-32C has an associated stackable compression limiter 34A, 34B, 34C received into a component mounting bore 36A, 36B, 36C. Compression limiters 34A, 34B and 34C may individually be of either the configuration of FIG. 1B or FIG. 4. As described earlier with FIG. 4, the radial flange 114 of the compression limiter includes an annular recess 126 sized and configured to engage and positionally lock the radial flange 114 against the engagement surface (16 or 116) or an axially aligned adjacent stackable compression limiter. Sleeve members 12 of the stackable compression limiters 34A-C may each have a different sleeve height (dimension location H illustrated in FIGS. 1A and 1B) selected relative to the thickness of the component (for example thickness TB of component 32B in FIG. 2) and according to component material properties such as elasticity and yield strength. The sleeve height H is typically less than the component thickness TB and is chosen to limit the compressive stress of the creep-susceptible component. Referring again to FIG. 2, an elongated compressive fastener (in one non-limiting example bolt 38) is shown extending through an aligned stack of stackable compression limiters 34A, 34B and 34C thereby compressibly securing together components 32A, 32B and 32C. Bolt 38 has a bolt head 40 having a head diameter HD greater than the bore diameter BDA of component 32A, such that the bolt head 40 is of sufficient diameter HD to compressively engage against a portion of a first mounting surface 42A of plastic component 32A.

As discussed earlier, the sleeve height H (see FIG. 1A or 1B) of the stackable compression limiter 34A is less than the thickness TA of the component 32A. The height H is selected to limit the compressive load on component 32A below a desired stress limit and also below the elastic limit of component 32A. Exceeding the elastic limit may cause the component to crack or otherwise structurally fail. In some applications a plurality of components (for example: 32A, 32B, 32C and substrate 46) need to be secured together in a manner that perfects a seal therebetween. In this case enough compression force must be applied between the stacked components to perfect the seal without providing too much compressive force resulting in the failure of any individual component in the stack.

In cases where any of the stacked assembly of components 32A, 32B and 32C are plastic components, plastic creep becomes an important factor over time. Creep is defined as the permanent deformation of the component resulting from prolonged application of compressive stress below the elastic limit of the component. Creep is influenced by the magnitude of the compressive stress, the time over which the compressive stress is applied, and the temperature (among other things). Various components in the stacked assembly may require differing upper limits of allowable compressive force.

For better understanding of the invention, we will temporarily assume herein that components 32A, 32B and 32C are plastic components. As shown in FIG. 2, components 32A, 32B and 32C have component thicknesses TA, TB and TC respectively. Initially there is no or only minimal compressive force applied to plastic component 32A, so it is expected that when bolt head 40 contacts the first mounting surface 42A the bolt head 40 is still separated from the engagement surface 16 (see FIG. 1) of stackable compression limiter 34A. Plastic components 32A, 32B, 32C are relatively compressibly elastic in comparison to relatively incompressible metallic stackable compression limiters 34A, 34B, 34C as discussed earlier and therefore components 32A, 32B, 32C may be expected to compress sufficiently (under application of an increasing compressive force FC) such that the thickness TA of plastic component 32A is eventually compressed to the point at which the stackable compression limiter 34A is operatively engaged. Compression limiter 34A is operatively engaged when the bolt head 40 compressively contacts the engagement surface 16 (see FIG. 1) at one end of stackable compression limiter 34A, thereby urging the radial flange 14 (see FIG. 1) of stackable compression limiter 34A to contact and press against a portion of the first mounting surface (for example 42B of component 32B) located directly beneath component 32A. Operative engagement of stackable compression limiter 34A shunts or bypasses an excess portion of the compression force FC through the engagement surface 16 of sleeve member 12 and radial flange 14 of compression limiter 34A, thereby protecting the component 32A from receiving a more elevated compressive stress that may cause the component to fracture or fail.

When stackable compressive limiter 34A is operatively engaged, the radial flange 14A of compression limiter 34A acts or presses against the first mounting surface 42B of the second plastic component 32B around the periphery of the component mounting bore 36B of plastic component 32B. This causes radial flange 14A to advantageously act as a virtual bolt head, transferring a portion of the compressive force FC onto the first mounting surface 42B in much the same way that the bolt head 40 transfers compressive force to the first mounting surface 42A of component 32A. Similarly, the radial flange 14B of compression limiter 34B presses against the first mounting surface 42C of the third plastic component 32C around the periphery of the component mounting bore 36C of plastic component 32C. Radial flange 14B also advantageously acts as a virtual bolt head to transfer compressive force FC onto the first mounting surface 42C in much the same way that the bolt head 40 transfers compressive forces to the first mounting surface 42A of component 32A. In this way components 32A, 32B and 32C are individually compressively mounted together and onto substrate 46, while the stackable compression limiters 34A, 34B and 34C each individually limit the compressive forces applied to each component 32A, 32B and 32C to a maximum compressive force that may be determined individually for each component 32A, 32B and 32C.

Continuing to refer to FIG. 2 and using as an example component 32B, after compressively mounting components 32A, 32B, 32C the compressive force FC applied through the fastener such as the illustrated bolt 38 results in compressive force F1 applied to plastic component 32B and a compressive force F2 applied to stackable compression limiter 34B by the radial flange of compression limiter 34A. Over time, as creep occurs in component 32B, force F1 will reduce and may eventually be removed. Force F2 (the axial compressive force between stacked compression limiters 34A and 34B) remains. The permanency of compressive force F2 enables positive interlocking between stacked component members to be retained over time. The use of stackable compression limiters also enables a reduced dimensional stack up tolerance for the assembly and permits perfected seals between components to be operatively retained over an extended time.

Figure 2A:
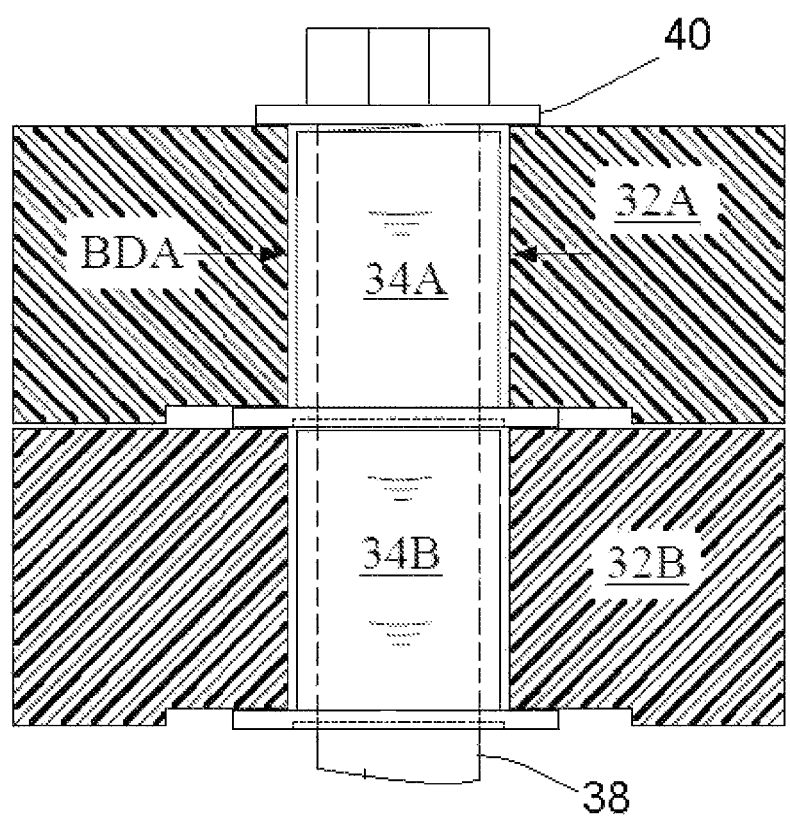
FIG. 2A schematically presents stacked components 32A and 32B with compression limiters 34A and 34B of FIG. 2. To improved clarity and removed redundant components FIG. 2A omits component 32C and substrate 46.

FIG. 2A shows the stacked plastic components 32A and 32B of FIG. 2. Spacked plastic component 32C and substrate 46 of FIG. 2 are present but are not shown in FIG. 2A). FIG. 2A shows the fastener (bolt 38) extending through compression limiters 34A and 34B (as well as through compression limiter 34C and into substrate 46, see FIG. 2) with the components 34A and 34B stacked, prior to applying the compressive force (FC FIG. 2) to compress the thickness of the plastic components 32A and 32B and engage the compression limiters 34A and 34B. As shown in FIG. 2A, prior to application of the compressive force FC (see FIG. 2), the engagement surface 116 (see FIG. 4) of compression limiter 34B has not engaged into the annular recess 126 (see FIG. 4) of compression limiter 34A.

Figure 2B:
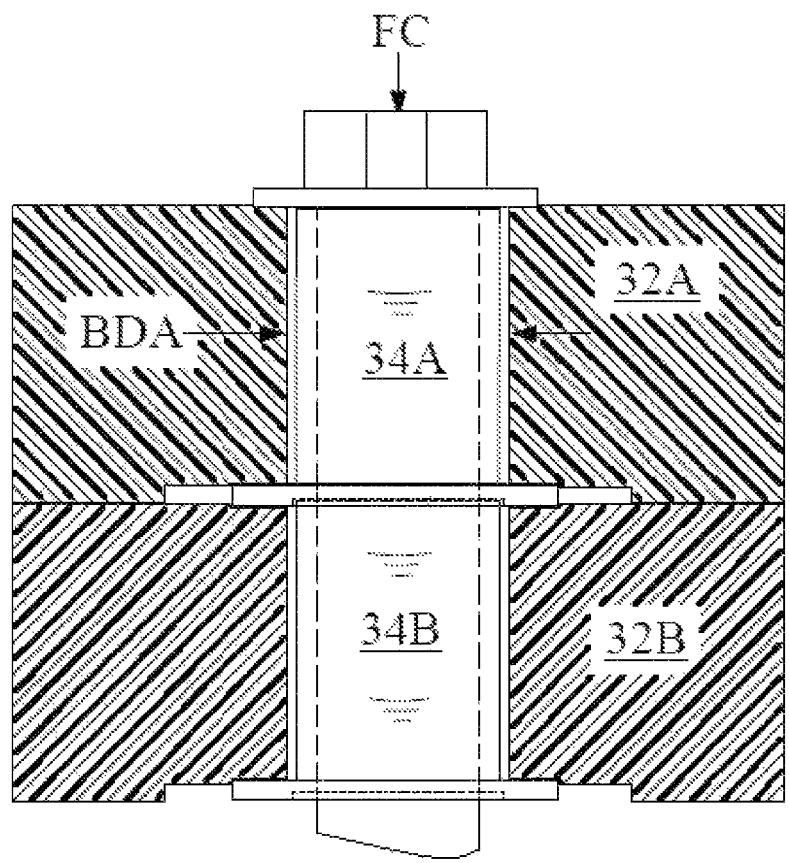
FIG. 2B schematically depicts the stacked components of FIGS. 2 and 2A with the fastener apply a compressive force to engage the compression limiters 34A and 34B.

FIG. 2B schematically shows compressive fastener (bolt 38 with head 40, see FIG. 2) applying a compressive force FC to stacked plastic components 32A and 32B and the compression limiters 34A and 34B, the compressive force FC compressibly reducing the component thickness (TA, TB on FIG. 2) until the stacked compression limiters (34A and 34B) axially engage (engagement surface 116 of the upper portion of compression limiter 34B into the annular recess 126 of compression limiter 34A, see also FIG. 4), wherein a first portion of the compressive force (F1, see FIG. 2) compresses the thickness of stacked plastic components 32A and 32B, with the remaining force F2 (see F2 in FIG. 2) passing axially through the compression limiters 32A and 32B. The compression limiters 34A and 34B are shown as compressively engaged with the top portion of compression limiter 32B engaged into the annular recess of adjacent compression limiter 32A.

FIG. 3 discloses a method of compressibly fastening a plurality of components, some of which are creep susceptible, into a singular compressibly bound assembly. The method begins at 305 by providing a plurality of components each having a opening therethrough and configured such that when assembled the openings are axially aligned. Then at 310 a plurality of stackable compression limiters are provided, each configured for axial end to end engagement and wherein each compression limiter is adapted for use with a different one of the plurality of components. Each compression limiter has a sleeve diameter configured to be received into a mounting opening of its associated component and includes a flange provided at one end and having an outer diameter larger than the component mounting opening. At 315 an elongated compression fastener is provided, sized and configured to extend through the openings of compression limiters when axially aligned and stacked. Then at 320 the method continues by selecting a first one of the components and its associated first compression limiter. At 325 the first compression limiter is installed into the opening of the first component. Then at 330 a next one of the components and its associated compression limiter are selected. At 335 the method continues by installing the compression limiter associated with the next component into the opening of the next component. Then at 337 the next component is positioned such that components having compression limiters installed are axially aligned and proximately positioned to enable the elongated fastener to be received therethrough. At 340 the method branches to step 330 to select a next component and its compression limiter, until all components have compression limiters installed. Then at 345 the method continues by axially inserting the elongated fastener through the aligned compression limiters such that portions of the fastener extends between outside faces of opposing outermost components of the stack. At 350 the elongated fastener is actuated to apply a compressive force to the stacked components. At 355 the applied compressive force is increased to axially compress the components about the axially aligned compression limiters at least until the axially aligned compression limiters abut end to end. Then at 360 an end of a compression limiter is lockably engaged into the annular recess of the flange of an adjacent compression limiter.

It should be understood that the invention is configured to compressibly secured together assemblies having any number of stacked components. Particularly in large stacked assemblies the advantages of improved dimensional stack up tolerance and the retention of perfected seals between stacked components is an even greater advantage. In one intended application of the present invention, sixty to seventy components are compressively mounted and sealed with a single bolt, providing an assembly with improved dimensional stability, long term compressive component to component sealing which also overcomes mounting failure due to the unavoidable creep of the plastic components. Advantageous applications include use in compressibly securing battery racks for electric "plug-in" cars. These battery racks include a large number of stacked creep susceptible plastic components which must be compressively secured to secure a large number of battery cells into the racks. These racks must remain tightly secured over an extended period of time. Previously compression limiting techniques are not serviceable on such assemblies.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A fastening assembly compressibly securing together a plurality of components, comprising:
   a plurality of stacked plastic components, each component having a mounting opening extending therethrough between a mounting surface of said component and an opposing side of said component;
   wherein said mounting openings of said stacked plastic components are axially aligned;
   a plurality of stacked compression limiters configured to engage axially end to end in tandem, said compression limiters each received into said mounting opening of a respective one of said stacked plastic components, each compression limiter including:

an elongated sleeve member with an axial bore therethrough;

an engagement surface provided at one end of said sleeve member;

a flange extending radially from an opposing end of said sleeve member, said flange having an outer portion of a flange surface sized and configured to compressively engage against said mounting surface of said respective one of said stacked plastic component, said flange surface having an inner portion configured to compressively engage against said engagement surface of an adjacent axially aligned compression limiter; and an elongated compressive fastener received into said axial aligned bores of said stacked compression limiters and extend through said axially aligned mounting openings of said stacked compression limiters;

wherein each of said compression limiters has a sleeve diameter sized to be received into said mounting opening of its associated stacked component;

wherein when no compressive force is applied, each compression limiter has a sleeve height less than a thickness of its associated stacked component measured between opposing sides of said component along said mounting opening such that the engagement surface of the sleeve is arranged within said mounting opening and said compression limiter does not extend completely through said mounting opening of its associated stacked component, said sleeve height selected to set an upper limit on an amount of compressive force applied to said associated stacked component by said compressive fastener;

wherein said compressive fastener applies a compressive force to said stacked plastic components and said compression limiters, said compressive force compressibly reducing said component thickness until said stacked compression limiters axially engage mounting said stacked components together such that the inner portion of the flange of a first compression limiter engages against said engagement surface of an adjacent axially aligned compression limiter;

wherein a first portion of said compressive force compresses a thickness of said stacked plastic component until said thickness is compressed to a point where said compression limiters compressively engage; and wherein an excess second portion of said compressive force is bypassed around said stacked components through said sleeve members and flanges of said compressively engaged compression limiters; and wherein said flange includes an annular recess engaging against and positionally locking against said engagement surface of axially aligned adjacent stackable compression limiter upon application of sufficient compressive force by said compressive fastener, preventing said lockably engaged compression limiters from dislocating radially relative to each other.

2. The fastening assembly of claim 1, wherein said elongated compressive fastener comprises a threaded bolt.

3. The fastening assembly of claim 1, wherein said stacked plastic components are relatively compressibly elastic in comparison to said stackable compression.

4. A method of compressibly fastening a plurality of components into a singular compressibly bound assembly, comprising:

providing said plurality of stackable plastic components each having a mounting opening therethrough and configured such that when assembled said mounting openings are axially aligned;

providing a plurality of stackable compression limiters configured for axial end to end engagement, wherein each compression limiter is adapted for use with an associated one of said plurality of components, wherein each compression limiter has a sleeve diameter configured to be received into said mounting opening of its associated component and includes a flange provided at one end having an outer diameter larger than said mounting opening and an engagement surface provided at an opposing end of said sleeve member;

wherein when no compressive force is applied, each compression limiter has a sleeve height less than a thickness of its associated stacked component measured between opposing sides of said component along said mounting opening such that said engagement surface of the sleeve is arranged within said mounting opening and said compression limiter does not extend completely through said mounting opening of its associated stacked component, said sleeve height selected to set an upper limit on an amount of compressive force applied to said associated stacked component by a compressive fastener;

providing an elongated compression fastener sized and configured to extend through said mounting openings when said compression limiters are axially aligned and stacked;

selecting a first one of said components and its associated first compression limiter;

installing said first compression limiter into said mounting opening of said first component;

selecting a next one of said components and its associated compression limiter;

installing said compression limiter associated with said next component into said mounting opening of said next component;

positioning said next component such that components having compression limiters installed are axially aligned and proximately positioned to enable said elongated fastener to be received therethrough;

continuing at the selecting a next one step until all components have compression limiters installed;

axially inserting said elongated fastener through said aligned compression limiters such that portions of said fastener extends between outside surfaces of opposing outermost components of said stack;

wherein due to said compression limiter having said sleeve height less than said component thickness surrounding said sleeve at the mounting opening into which said compression limiter is installed, said compression limiters do not abut in end to end contact until compressive force is applied;

actuating said elongated fastener to apply a compressive force to said stacked components, wherein said flange of said compression limiter engages and presses against a first mounting surface of an another component adjacent to said flange and abutting said associated plastic component of said compression limiter, said flange transferring a portion of said compressive force onto said first mounting surface; and increasing said compressive force, compressing thickness of said components using said axially aligned compression limiters at least until said compressive force is sufficient such that axially aligned compression limiters abut in end to end contact;

wherein at least some portion of said compression limiters have a length selected to enforce a limit of compressive force applied to its associated component when said compression limiters are abutted;

wherein said selected length of said compression limiter of each associated component are predetermined to establish said limit; and wherein a first portion of said compressive force compresses said thickness of said stacked plastic component until said thickness is compressed to a point where said compression limiters compressively engage such that the inner portion of the flange of at least one of the compression limiters engages against said engagement surface of an adjacent axially aligned compression limiter; and wherein an excess second portion of said compressive force is bypassed around said stacked components through said sleeve members and flanges of said compressively engaged compression limiters; and wherein after the increasing step the method further comprises: lockably engaging one end of said compression limiter into an annular recess of said flange of an adjacent compression limiter.

* * * * *